(12) United States Patent
Omichi et al.

(10) Patent No.: US 8,641,274 B2
(45) Date of Patent: Feb. 4, 2014

(54) POLARIZATION-MAINTAINING FIBER AND OPTICAL FIBER SENSOR USING SAME

(75) Inventors: Koji Omichi, Sakura (JP); Yoshihiro Terada, Sakura (JP); Yutaka Endoh, Sakura (JP); Kazuyuki Hayashi, Sakura (JP); Katsuaki Izoe, Sakura (JP); Kazuhiko Aikawa, Sakura (JP); Manabu Kudoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/112,457

(22) Filed: May 20, 2011

(65) Prior Publication Data

US 2012/0044971 A1 Feb. 23, 2012

Related U.S. Application Data

(63) Continuation of application No. PCT/JP2010/070838, filed on Nov. 22, 2010.

(30) Foreign Application Priority Data

Aug. 18, 2010 (JP) ................................. 2010-183215

(51) Int. Cl.
 *G01K 11/00* (2006.01)
 *G01K 1/00* (2006.01)
 *G01N 25/00* (2006.01)
 *G01J 5/00* (2006.01)

(52) U.S. Cl.
 USPC ............. 374/161; 374/131; 374/45; 374/120; 385/124

(58) Field of Classification Search
 USPC ................... 374/131, 161, 120, 45; 385/124
 See application file for complete search history.

(56) References Cited

U.S. PATENT DOCUMENTS

| | | | | |
|---|---|---|---|---|
| 5,482,525 | A | * | 1/1996 | Kajioka et al. ................. 65/398 |
| 6,056,436 | A | * | 5/2000 | Sirkis et al. .................... 374/161 |
| 2001/0022804 | A1 | * | 9/2001 | Helmig et al. ................. 374/161 |
| 2001/0026362 | A1 | * | 10/2001 | Gleine et al. .................... 356/32 |
| 2002/0041724 | A1 | * | 4/2002 | Ronnekleiv et al. ............ 385/12 |
| 2003/0142319 | A1 | * | 7/2003 | Ronnekleiv et al. .......... 356/477 |
| 2004/0046963 | A1 | * | 3/2004 | Lackritz et al. ................ 356/445 |
| 2004/0165809 | A1 | * | 8/2004 | Kersey et al. ................... 385/12 |

(Continued)

FOREIGN PATENT DOCUMENTS

| CN | 1643418 | 7/2005 |
|---|---|---|
| CN | 1643418 A | 7/2005 |

(Continued)

OTHER PUBLICATIONS

Koji Omichi, et al., "Strain and Temperature Multiplexed Measurement Sensor Utilizing Polarization Maintaining Fiber", IEICE Technical Report OPE2009-74-OPE2009-106, Optical Electronics, Aug. 2009; pp. 117-122; vol. 109, No. 175.

(Continued)

*Primary Examiner* — Mirellys Jagan
(74) *Attorney, Agent, or Firm* — Sughrue Mion, PLLC

(57) ABSTRACT

The polarization-maintaining fiber of the invention includes a core (1) made of germanium doped silica glass; a stress-applying part (3) made of boron doped silica glass; a cladding (2) made of pure silica glass; and a polyimide coating layer (4) with a thickness of 10 μm or less that surrounds the outer periphery of the cladding (2).

3 Claims, 9 Drawing Sheets

(56) References Cited

U.S. PATENT DOCUMENTS

| | | | |
|---|---|---|---|
| 2005/0247082 A1* | 11/2005 | Kersey et al. | 65/393 |
| 2007/0075225 A1* | 4/2007 | Xia et al. | 250/227.14 |
| 2007/0116417 A1* | 5/2007 | Aikawa et al. | 385/123 |
| 2008/0062508 A1* | 3/2008 | Tammela et al. | 359/341.3 |
| 2010/0134783 A1 | 6/2010 | Omichi et al. | |
| 2010/0141930 A1 | 6/2010 | Omichi et al. | |
| 2010/0254669 A1* | 10/2010 | Takenaga et al. | 385/123 |

FOREIGN PATENT DOCUMENTS

| | | |
|---|---|---|
| JP | 63-017242 A | 1/1988 |
| JP | 08-313749 A | 11/1996 |
| JP | 2001-154069 A | 6/2001 |
| JP | 2002-228871 A | 8/2002 |
| JP | 2003-057479 A | 2/2003 |
| JP | 2003-156647 A | 5/2003 |
| JP | 2004-264536 A | 9/2004 |
| JP | 3819119 B2 | 9/2006 |
| JP | 4420982 B2 | 2/2010 |
| JP | 4474494 B2 | 6/2010 |

OTHER PUBLICATIONS

Yutaka Endoh et al., "Polarization-Maintaining Fiber with High Temperature Resistant Coating", IEICE Technical Report OPE2010-1-OPE2010-15, Optical Fiber Applied Technology, May 2010, pp. 31-36, vol. 110, No. 58.

International Search Report for PCT/JP2010/070838 dated Dec. 16, 2010.

Chinese Office Action dated Jun. 18, 2013, issued in Chinese Patent Application No. 201080011996.6.

Akihito Hongo, et al., "Polyimide Coated Fiber Bragg Grating for Strain Sensing", Papers of IEICE Electronics Society Conference 2000 I, Sep. 2000, pp. 159, C-3-34.

Japanese Office Action for Japanese Application No. 2011-509336 mailed Oct. 1, 2013.

* cited by examiner

◇ SLOW AXIAL BRAGG WAVELENGTH OF FBG AFTER BEING ATTACHED TO BASE PLATE (EXAMPLE 3)
□ FAST AXIAL BRAGG WAVELENGTH OF FBG AFTER BEING ATTACHED TO BASE PLATE (EXAMPLE 3)
◆ SLOW AXIAL BRAGG WAVELENGTH OF FBG BEFORE BEING ATTACHED TO BASE PLATE (EXAMPLE 2)
■ FAST AXIAL BRAGG WAVELENGTH OF FBG BEFORE BEING ATTACHED TO BASE PLATE (EXAMPLE 2)

POLARIZATION-MAINTAINING FIBER AND OPTICAL FIBER SENSOR USING SAME

BACKGROUND OF THE INVENTION

1. Field of the Invention

The present invention relates to a polarization-maintaining fiber that can be used in a temperature range of approximately −60 to +300° C. and an optical fiber sensor that uses this fiber.

Priority is claimed on Japanese Patent Application No. 2010-183215, filed Aug. 18, 2010, the content of which is incorporated herein by reference.

2. Background Art

In strain and temperature sensing technology using optical fibers, there is a problem in that, when strain and temperature change are induced simultaneously in an object to be measured, it is difficult to measure strain and temperature change discriminatively.

With respect to this problem, sensors that can measure strain and temperature simultaneously using a polarization maintaining fiber and a method thereof are disclosed in Japanese Patent No. 3819119 (refer to Patent Document 1), Japanese Patent No. 4420982 (refer to Patent Document 2), Japanese Patent No. 4474494 (refer to Patent Document 3), and "Strain and Temperature Multiplexed Measurement Sensor Utilizing Polarization Maintaining Fiber", Koji Omichi, Daichi Wada, Hideaki Murayama, Hirotaka Igawa, IEICE Technical Report, Vol. 109, No. 175, OPE2009-97, pp. 117-122, August 2009 (refer to Non-Patent Document 1).

Patent Documents 1 to 3 and Non-patent Document 1 show that the upper limit of the measurable temperature is approximately +120° C. (a temperature change from room temperature is approximately 100° C.) (refer to FIG. 4 of Patent Document 1, paragraphs 0071 to 0072 of Patent Document 2, paragraphs 0095 to 0096 of Patent Document 3, and "4.2 Simultaneous measurement of strain and temperature" in Non-patent Document 1).

This is because a polarization-maintaining fiber that is used in the sensing portion is coated with a UV-curable (an ultraviolet curable) acrylate, and the heat resistant temperature of this coating layer is approximately +120° C.

However, there has increasingly been a demand to provide an optical fiber sensor that is capable of measuring strain and temperature change simultaneously beyond the above-described temperature range.

Specifically, the optical fiber sensor is required in a high temperature environment that is represented by oil wells (for example, +150 to +300° C.) and an environment with large temperature fluctuations represented by aircraft (for example, −60 to +120° C.).

In these fields of application, it is difficult to apply the optical fiber sensor due to the heat resistant temperature of the coating material as described above.

SUMMARY OF THE INVENTION

The invention was conceived in view of the above-described circumstances, and has an object to provide a polarization-maintaining fiber that can be used in a temperature range of approximately −60 to +300° C. and an optical fiber sensor that can measure strain and temperature simultaneously using this fiber.

In order to solve the problem, the polarization-maintaining fiber of the first aspect of the invention includes a core made of germanium doped silica glass, a stress-applying part made of boron doped silica glass, a cladding made of pure silica glass, and a polyimide coating layer with a thickness of 10 μm or less that surrounds the outer periphery of the cladding.

In the polarization-maintaining fiber of the first aspect of the invention, it is preferable that modal birefringence at a wavelength of 1550 nm and at a temperature of +22° C. be larger than or equal to $5 \times 10^{-4}$.

In order to solve the aforementioned problem, the optical fiber sensor of the second aspect of the invention includes a sensing portion that includes the aforementioned polarization-maintaining fiber. In the optical fiber sensor, strain and temperature are measured simultaneously in a temperature range of −60 to +300° C.

In the polarization-maintaining fiber of the second aspect of the invention, it is preferable that a fiber Bragg grating be formed in the sensing portion.

In the polarization-maintaining fiber of the second aspect of the invention, it is preferable that the sensing portion be attached to a structure that is the object to be measured, and induced strain and temperature in the structure are measured simultaneously.

EFFECTS OF THE INVENTION

According to the polarization-maintaining fiber of the first aspect, the coating layer exhibits an excellent heat resistance. In addition, polyimide coating layer with a thickness of 10 μm or less enables a low transmission loss and a superior polarization crosstalk because the polyimide coating layer with a thickness of 10 μm or less can suppress the effects of microbending, and the polarization-maintaining fiber can be used in a temperature range of approximately −60 to +300° C.

According to the optical fiber sensor of the second aspect, simultaneous measurement of strain and temperature is possible in a temperature range of approximately −60 to +300° C.

DESCRIPTION OF THE PREFERRED EMBODIMENTS

Hereinafter, the invention will be described with reference to the appended drawings, based on the preferred embodiments.

Also, in these drawings which are utilized in the following explanation, appropriate changes have been made in the scale of the various members, in order to represent them at scales at which they can be easily understood.

Figure 1:
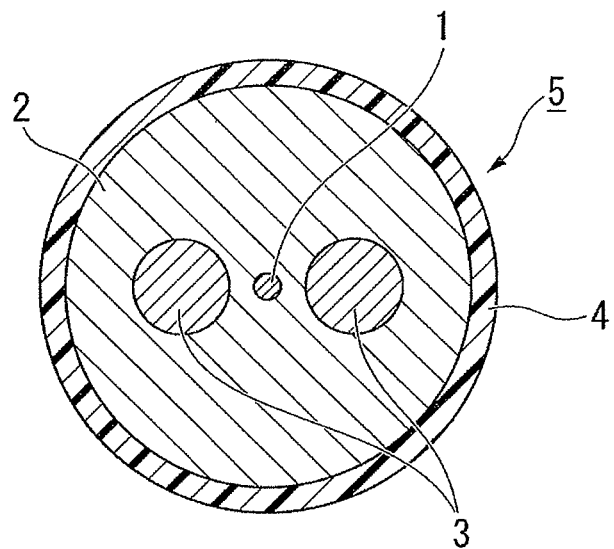
FIG. 1 is a cross-sectional view showing an example of a polarization-maintaining fiber of the invention.

FIG. 1 is a cross-sectional view showing a polarization-maintaining fiber 5 of the embodiment.

This polarization-maintaining fiber 5 consists of a center core 1, one pair of stress-applying parts 3 and 3, a cladding 2, and a coating layer 4.

The stress-applying parts 3 and 3 are separated from the core 1, and are arranged so as to face each other symmetrically for the core 1.

The cladding 2 encloses the core 1 and the stress-applying parts 3 and 3.

The coating layer 4 surrounds the outer periphery of the cladding 2.

It is preferable that the core 1 have a circular form in the cross-sectional face, and be made of germanium (Ge) doped silica glass.

It is preferable that the cladding 2 be arranged in a concentric manner on the outer periphery of the core 1, and be made of pure silica glass.

It is preferable that the stress-applying parts 3 and 3 be arranged in the cladding 2, and be made of boron (B) doped silica glass.

The linear expansion coefficient of the B doped silica glass which constitutes these stress-applying parts 3 is larger than the linear expansion coefficient of the pure silica glass which constitutes the cladding 2.

The constitution of the polarization-maintaining fiber shown in FIG. 1 (polarization-mode maintaining optical fiber) is a PANDA (polarization-maintaining and absorption-reducing) type in which the cross-sectional shape of the stress-applying part 3 is circular.

Figure 3A:
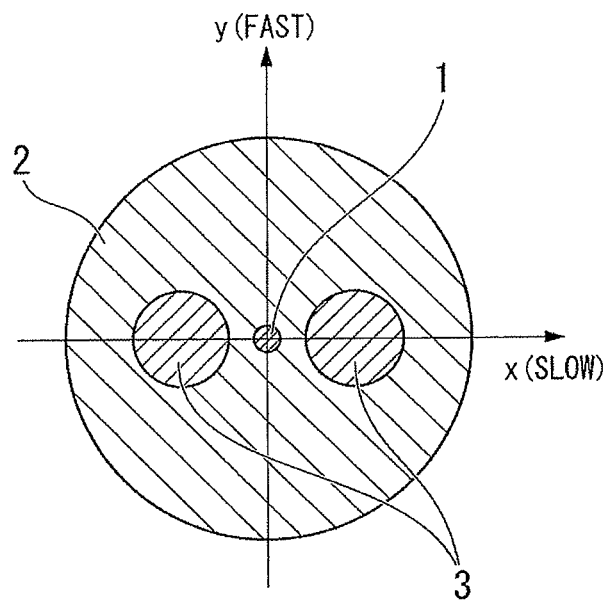
FIG. 3A is a cross-sectional view showing an example of a cross-sectional structure of a PANDA fiber.

As shown in FIG. 3A, the polarization-maintaining fiber 5 has two polarization axes that are orthogonal to each other, that is, an X-axis (slow axis) and a Y-axis (fast axis). The slow axis is shown by the straight line passing through the center of each of the stress-applying parts 3 and 3, and the center of the core 1. The fast axis is shown by the straight line that intersects perpendicularly with the slow axis and passes through the center of the core 1.

Figure 3B:
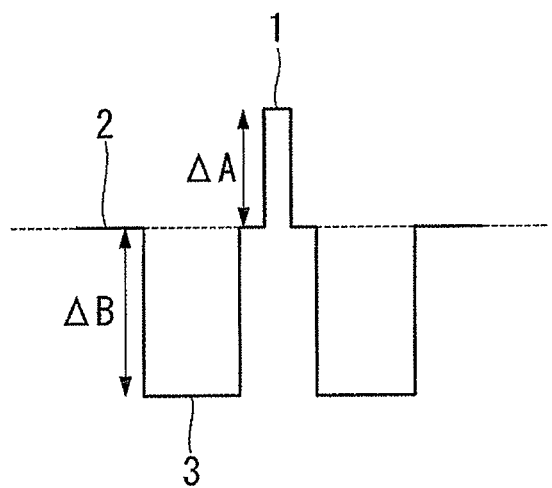
FIG. 3B is a graph showing an example of the refractive index profile along the X axis (slow axis) of a PANDA fiber.

As shown in FIG. 3B, since the refractive index of the core 1 is larger than the refractive index of the cladding 2, the relative refractive index difference $\Delta A$ between the core 1 and the cladding 2 becomes a positive value. On the other hand, since the refractive index of a stress-applying part 3 is less than the refractive index of cladding 2, the relative refractive index difference $\Delta B$ between the stress-applying part 3 and the cladding 2 becomes a negative value.

As mentioned above, since the linear expansion coefficient of the stress-applying part 3 is larger than the linear expansion coefficient of the cladding 2, the stress-applying part 3 shrinks more than the cladding 2 in the cooling step of the fiber drawing process. For this reason, the stress-applying part 3 induces tensile strain for the surrounding cladding 2 and the core 1. As a result, birefringence is generated in the core 1 due to the photoelastic effect of this strain, and modal birefringence (modal birefringence rate) is induced. Modal birefringence serves as an index of the polarization-maintaining performance, in that the higher this value, the higher the polarization-maintaining performance. In the embodiment, it is preferable that this modal birefringence at a wavelength of 1550 nm and at a temperature of +22° C. be larger than or equal to $5 \times 10^{-4}$. As structures of a PANDA fiber, a structure having a smaller arrangement interval between the stress-applying parts 3 and 3, and another structure having a larger arrangement interval between the stress-applying parts 3 and 3 are known. Generally the structure having a smaller arrangement interval leads to larger modal birefringence, while the structure having a larger arrangement interval leads to smaller modal birefringence. Accordingly, as the structure of the stress-applying parts 3 and 3, it is preferable to adopt the smaller arrangement interval.

The polarization-maintaining fiber 5 of the embodiment is an optical fiber that uses polyimide with a thickness of 10 μm or less as the coating layer 4 protecting the silica glass portions (core 1, cladding 2, and stress-applying parts 3 and 3). Although the silica glass portions exhibit a high heat resistance of approximately 1000° C., UV-curable acrylate used for common optical fiber has a poor heat resistance. Therefore, by using polyimide with excellent heat resistance as the coating layer 4, it is possible to prevent damage such as deterioration of the coating layer 4 even in a temperature range of approximately −60 to +300° C. However, the Young's modulus of the polyimide is approximately 1 to 3 orders of magnitude larger than that of UV-curable acrylate, which causes microbending in the fiber, and the microbending results in the problem of the transmission loss increasing and of the polarization-maintaining performance degradation. However, polyimide coating layer 4 with a thickness of 10 μm or less (hereinafter, also refer to the polyimide coating layer 4) can suppress the increase of the transmission loss and the degradation of the polarization crosstalk due to the microbending. Specifically, it is possible to realize a polarization-maintaining fiber that satisfies the specifications of the transmission loss of 1 dB/km or less at the operating wavelength (for example, the 1550 nm band) and the polarization crosstalk of −25 dB/100 m or less, in the temperature range of −60 to +300° C. Accordingly, the polarization-maintaining fiber 5 of the embodiment can be preferably used as a sensor application and as a communication application, and in particular, the polarization-maintaining fiber 5 can be preferably used as a sensor that can measure strain and temperature simultaneously in a temperature range of approximately −60 to +300° C.

The optical fiber sensor of the embodiment has a sensing portion that includes the aforementioned polarization-maintaining fiber 5. In this optical fiber sensor, in the case of measurement light being launched into the two orthogonal polarization axes of the polarization-maintaining fiber 5, it is possible to measure strain and temperature simultaneously based on the characteristics changes of the reflected light or scattered light arising from the measurement light. It is possible to use publicly known Bragg reflected light, Brillouin scattered light, stimulated Brillouin scattered light as the reflected light or scattered light for performing simultaneous measurement.

Among such lights, Bragg reflected light enable us to achieve high precision measurement because the light intensity is much higher, and the change in the characteristics thereof with respect to strain and temperature change (Bragg wavelength shift) is much larger than that of Brillouin scattered light and stimulated Brillouin scattered light.

Figure 2:
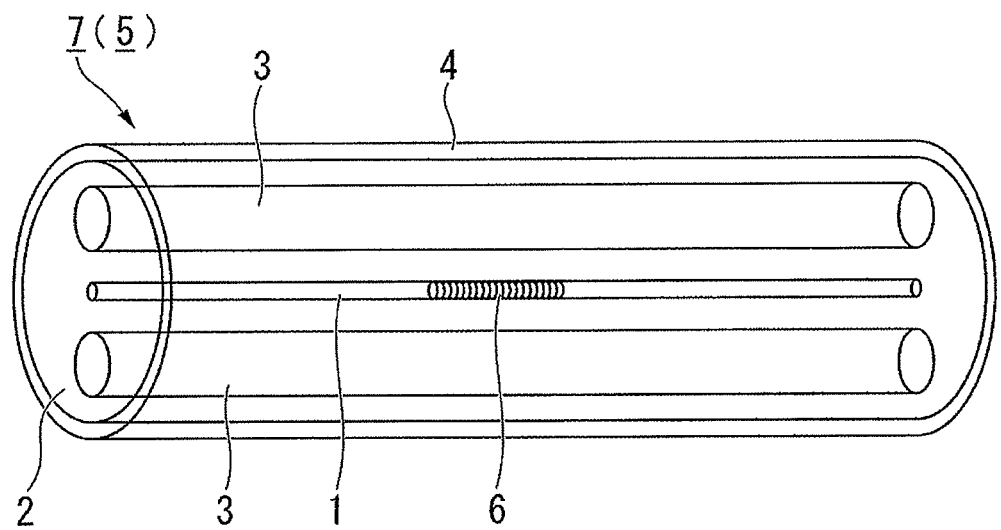
FIG. 2 is a perspective view showing an example of a sensing portion in which an FBG is formed in the polarization-maintaining fiber of the invention.

In the case of simultaneous measurement of strain and temperature using Bragg reflected light, as shown in FIG. 2, a Fiber Bragg Grating (FBG) 6 is formed in the core 1 of the polarization maintaining fiber that constitutes a sensing portion 7. As a method of manufacturing the FBG, the phase mask exposure method or the two-beam interference exposure method using a krypton fluoride (KrF) excimer laser or an argon (Ar) SHG (second harmonic generation) laser is employed to induce refractive index modulation along the longitudinal direction of the core 1. A plurality of FBGs may be arranged along the longitudinal direction of the polarization-maintaining fiber.

As a method of measuring Bragg reflected light, it is possible to use a method based on Bragg reflection spectrometry using a publicly known spectrum analyzer, a method based on light intensity modulation using a wavelength swept tunable laser and a light receiving element such as a photo diode, and a method based on the optical frequency domain reflectometry (OFDR).

In the case of using a method based on OFDR, it is possible to use the physical quantity measuring apparatus disclosed in Patent Documents 2 and 3. In the case of applying the invention to these physical quantity measuring apparatus, the aforementioned polarization-maintaining fiber 5 is used for the polarization-maintaining fiber having FBG as the sensing portion.

In the case of performing measurement by Brillouin scattered light and stimulated Brillouin scattered light, since there is no need to form an FBG in the core 1, it is possible to perform the measurement along the longitudinal direction all over the polarization-maintaining fiber, which is suited to the case of the huge objective structure to be measured.

As a measurement method for Brillouin scattered light and stimulated Brillouin scattered light, it is possible to use the publicly known Brillouin optical time domain reflectometry (BOTDR) method, Brillouin optical time domain analysis (BOTDA) method, and Brillouin optical correlation domain analysis (BOCDA) method, and the like.

Single polarization and narrow bandwidth laser is used as a measurement light source. As such a measurement light source, for example, a DFB (distribution feedback) laser diode, a single polarization fiber laser, and the like are used.

In the case of performing measurement by Brillouin scattered light and stimulated Brillouin scattered light, this scattered light is input into photodiode, and change in the characteristics for the strain and temperature change is measured.

Also in these measurements, the above-mentioned polarization-maintaining fiber 5 is used for the polarization-maintaining fiber as the sensing portion.

In the case of any of the measurement methods, the polyimide coating with a thickness of 10 μm or less is used for coating layer 4 of the polarization-maintaining fiber that constitutes the sensing portion 7. For this reason, it is possible to measure strain and temperature in a temperature range of approximately −60 to +300° C. In particular, in a temperature range of −60 to +300° C., by using a polarization-maintaining fiber that satisfies the specifications of the transmission loss of 1 dB/km or less at the operating wavelength (for example 1550 nm band) and the polarization crosstalk of −25 dB/100 m or less, it is possible to perform simultaneous measurement of strain and temperature in a wide temperature range from a lower temperature to a higher temperature with high accuracy.

In the optical fiber sensor of the embodiment, it is possible to perform simultaneous measurement of strain and temperature by directly attaching the sensing portion to the objective structure to be measured. Provided it is possible to attach the optical fiber (sensor) to the objective structure to be measured, it may be anything. For example, in the oil well field, a stainless steel pipeline and a stainless steel pressure diaphragm that performs pressure measurement of a well are given. Moreover, in the aircraft field, the main tail assembly made of carbon fiber reinforced plastics (CFRP) is mentioned. At this time, the adhesive for attaching an optical fiber (sensor) is selected according to the temperature range in a structure. Specifically, it is desirable that the adhesive exhibit small changes of the bonding performance and Young's modulus in the temperature range of a structure, and in the case of the temperature range −60 to +300° C., it is preferable to use polyimide.

As described above, the invention was described based on a preferred embodiment, the technical scope of the invention is not limited to the aforementioned embodiment, and it is possible to make various modifications in a scope that does not depart from the spirit of the invention.

In addition, not only PANDA-type polarization-maintaining fiber, but also various types of polarization-maintaining fibers such as bow tie-type fiber and elliptical cladding-type fiber may be applied in the present invention.

Also, the polarization-maintaining fiber can be used for optical transmission and optical communication applications.

EXAMPLES

Hereinafter, the invention will be specifically described using Examples.

Example 1

Polarization-Maintaining Fiber

As shown in FIGS. 3A and 3B, a PANDA-type fiber which consists of the core 1 made of Ge doped silica glass, the stress-applying parts 3 made of B doped silica glass and the cladding 2 made of pure silica glass was fabricated. The relative refractive index difference ΔA between the core 1 and the cladding 2 was +0.4%, and the relative refractive index difference ΔB between the stress-applying parts 3 and the cladding 2 was 0.7%. Then, the outer periphery of the cladding 2 was coated with the polyimide coating layer 4, as shown in FIG. 1. Finally, the polyimide-coated polarization-maintaining fiber 5 according to Example 1 was manufactured. At this time, a small amount of an additive agent was doped to the polyimide coating layer 4 in order to improve the mechanical strength properties to be implemented (evaluated) subsequently.

Table 1 shows the optical properties of the polyimide-coated PANDA fiber of Example 1 that is obtained as described above. The optical characteristics other than the cut-off wavelength are all measured values at a wavelength of 1550 nm.

TABLE 1

| | |
|---|---|
| OUTER DIAMETER OF CLADDING (μm) | 125 |
| OUTER DIAMETER OF COATING (μm) | 143 |
| THICKNESS OF COATING LAYER (μm) | 9 |
| CORE ECCENTRIC AMOUNT (μm) | 0.2 |
| TRANSMISSION LOSS (dB/km) | 0.88 |
| MODE FIELD DIAMETER (μm) | 9.5 |
| CUTOFF WAVELENGTH (μm) | 1.33 |
| BEAT LENGTH (mm) | 2.8 |
| MODAL BIREFRINGENCE | $5.5 \times 10^{-4}$ |
| POLARIZATION CROSSTALK (dB/100 m) | −25 |
| BENDING LOSS (dB) DIAMETER 20 mm × 10 turns | 0.006 |

Wavelength: 1550 nm (Wavelength Dependence of Transmission Loss)

Figure 4A:
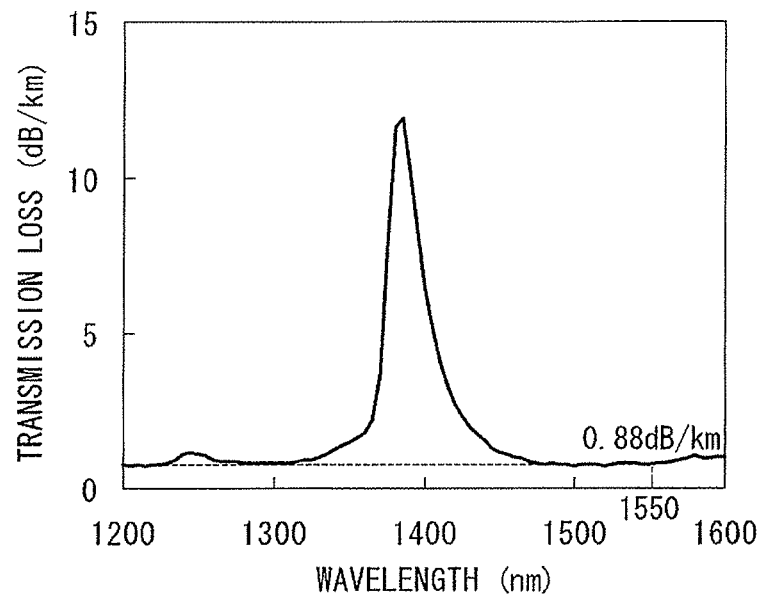
FIG. 4A is a graph showing an example of the wavelength dependence of transmission loss for the polarization-maintaining fiber of Example 1.

FIG. 4A shows the wavelength dependence of transmission loss of the polyimide-coated PANDA fiber of Example 1. The wavelength dependence of transmission loss was measured in a state of the fiber being wound in an inspection spool (shank diameter; 380 mm). There was no loss degradation at the longer wavelength due to the boron that is doped in the stress-applying parts 3, and so a favorable transmission loss characteristic was obtained. Although absorption loss caused by the OH bonding at the wavelength of approximately 1380 nm was observed, there was hardly any effect on the 1550 nm band. As indicated in Table 1, the transmission loss at 1550 nm was 0.88 dB/km (Temperature Dependence of Transmission Loss)

Figure 4B:
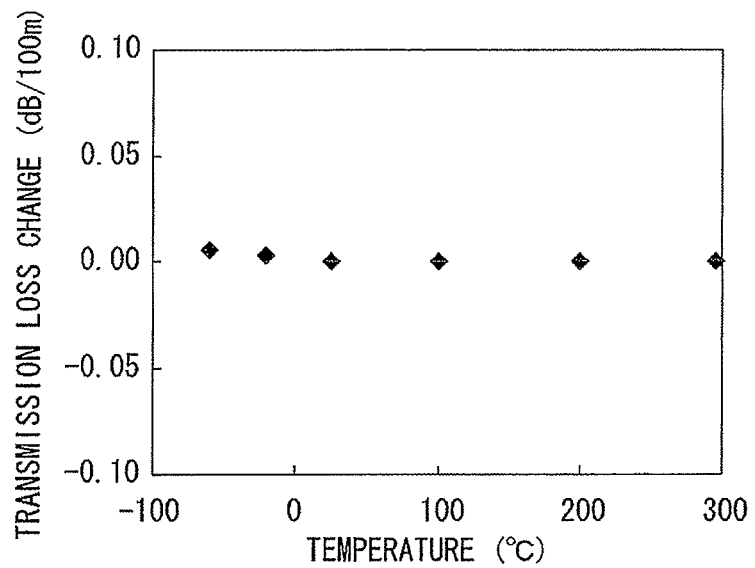
FIG. 4B is a graph showing the temperature dependence of transmission loss change for the polarization-maintaining fiber of Example 1.

The temperature dependence of the transmission loss for the 100 m-length polyimide-coated PANDA fiber of Example 1 was evaluated. FIG. 4B shows the temperature dependence of the transmission loss change in the temperature range of −60 to +300° C. Note that the vertical axis (transmission loss change) shows the loss change from the transmission loss at +25° C. Although the loss increased a little at the lower temperature range, the change was sufficiently small to use as a sensor application.

(Bending Diameter Dependence of Bending Loss)

Figure 5:
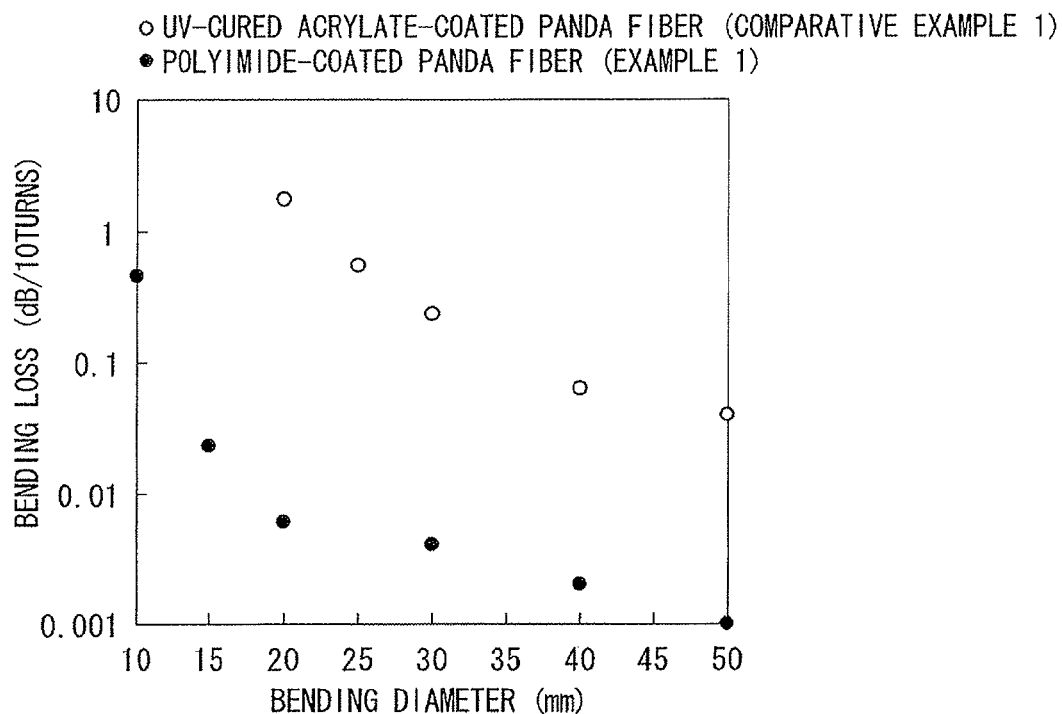
FIG. 5 is a graph showing the relationship between bending diameter and bending loss for the polarization-maintaining fiber of Example 1 and Comparative Example 1.

The bending diameter dependence of the bending loss (at a measurement wavelength of 1550 nm) for the polyimide-coated PANDA fiber of Example 1 and for a conventional 1550 nm PANDA fiber (Comparative Example 1) were measured. FIG. 5 shows the measurement results.

In the PANDA fiber of Comparative Example 1, a PANDA fiber with a cladding outer diameter of 125 μm is coated with a UV-curable acrylate, with the 240 μm outer coating diameter.

For example, when a bending diameter was 20 mm, the bending loss of Comparative Example 1 was approximately 1 dB, while the bending loss of Example 1 was approximately 0.006 dB. From this result, it is confirmed that the polyimide-coated PANDA fiber of Example 1 has a superior bending loss characteristic, and the bending loss characteristic corresponds approximately 1/100 that of Comparative Example 1.

(Bending Diameter Dependence of Polarization Crosstalk)

Figure 6:
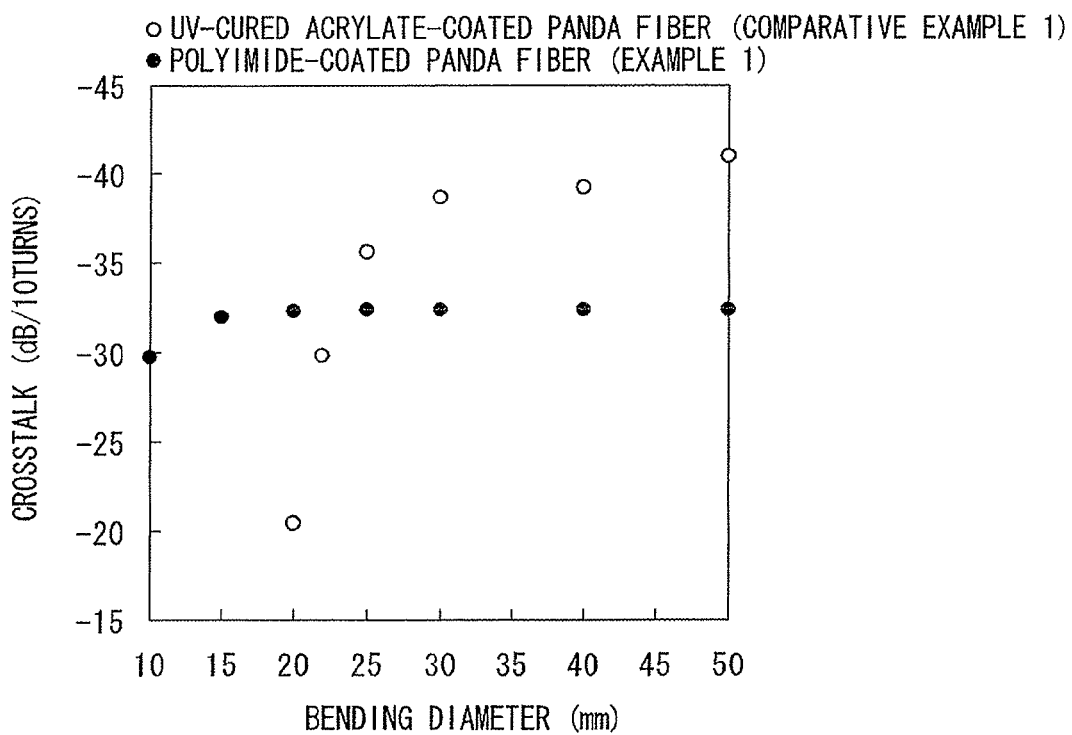
FIG. 6 is a graph showing the relationship between the bending diameter and polarization crosstalk for the polarization-maintaining fiber of Example 1 and Comparative Example 1.

The bending diameter dependence of the polarization crosstalk (at a measurement wavelength of 1550 nm, sample length of 2.5 m) of the polyimide-coated PANDA fiber of Example 1 and a conventional 1550 nm PANDA fiber (Comparative Example) were measured. FIG. 6 shows the measurement results. The comparative example is the same as the PANDA fiber used in the aforementioned measurement of the bending diameter dependence of the bending loss (Comparative Example 1).

The polarization crosstalk is a value that expresses the polarization maintaining performance of a PANDA fiber. Specifically, in the case of linearly polarized light being launched into one end of a fiber along the X-axis or Y-axis and this linearly polarized light propagating a certain distance in the fiber, polarization crosstalk is defined as the intensity ratio, at the opposite end of the fiber, between the linearly polarized component in the incident axis and the leaky component in the polarized axis being orthogonal to the incident direction. In the case of the incident light being Y-axis polarization, crosstalk is defined as 10×log (Px/Py), where Py is the light intensity of the linearly polarized component in the incident direction and Px is the light intensity of the leaky component in the polarized axis being orthogonal to the incident direction.

The microbending due to the coating layer and macrobending due to the fiber bending cause degradation of polarization crosstalk. Since the polyimide-coated PANDA fiber of Example 1 consists of polyimide coating, microbending is easily induced compared to Comparative Example that uses UV-curable acrylate. For this reason, at a bending diameter of 50 mm, the crosstalk value of the polyimide-coated PANDA fiber of Example 1 is −32 dB/10 turns, which is deteriorated compared to the crosstalk value of −40 dB/10 turns for the PANDA fiber of Comparative Example 1. However, in the case of the bending diameter becoming smaller, that is, in the case of the bending diameter gradually decreasing from 50 mm to 10 mm, the crosstalk value significantly deteriorates in the PANDA fiber of the conventional example. In contrast, the crosstalk value of the polyimide-coated PANDA fiber of Example 1 has hardly deteriorated, and even at a bending diameter of 10 mm×10 turns, it was confirmed that the value was maintained at approximately −30 dB/10 turns. From this result, in the polyimide-coated PANDA fiber of Example 1, it is evident that deterioration of the polarization crosstalk caused by the fiber bending is dramatically suppressed.

(Temperature Dependence of Polarization Crosstalk)

Figure 7:
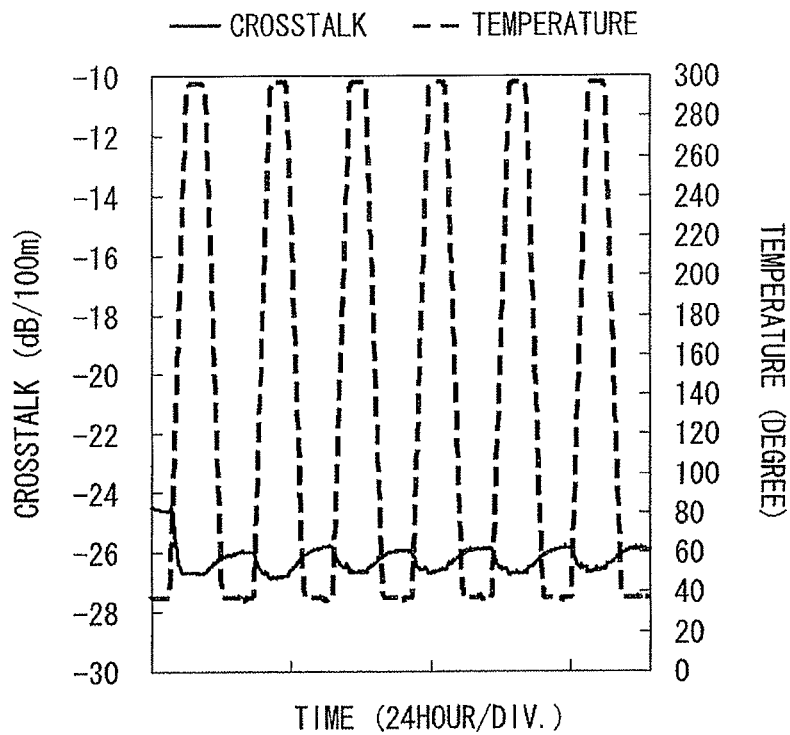
FIG. 7 is a graph showing the temperature dependence of polarization crosstalk of the polarization-maintaining fiber of Example 1 in the higher temperature range.
Figure 8:
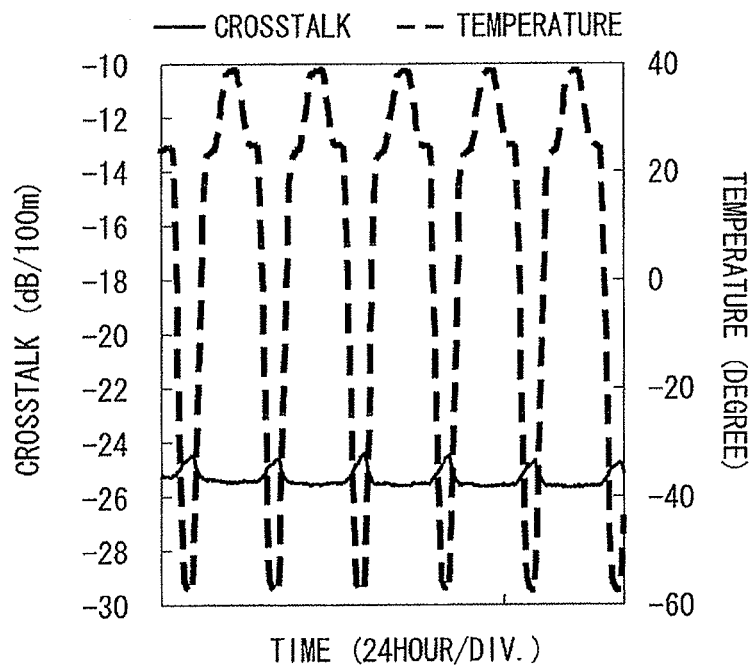
FIG. 8 is a graph showing the temperature dependence of polarization crosstalk of the polarization-maintaining fiber of Example 1 in the lower temperature range.

The temperature dependence of the polarization crosstalk for the 100 m-length polyimide-coated PANDA fiber of Example 1 was evaluated. Since the heat resistant temperature range of the polyimide used in the coating layer is −60 to +300° C., evaluation was performed when repetitive temperature changes were imposed from −60 to +40° C. (lower temperature range) and +40 to +300° C. (higher temperature range). FIG. 7 shows the evaluation result in the higher temperature range, while FIG. 8 shows the evaluation result in the lower temperature range. The left axis of the graphs (the vertical axis that is positioned on the left side in FIG. 7 and FIG. 8) shows crosstalk, and a reduction of the value of crosstalk (downward on the axis) means superior polarization crosstalk.

From FIG. 7, in the higher temperature range (+40 to +300° C.), the suppressed polarization crosstalk fluctuation of approximately +/−1 dB/100 m is confirmed except for the initial fluctuation. Also, it is understood that since microbending of the fiber due to the polyimide coating is relieved, the crosstalk improves during the temperature increasing and the temperature maintaining at +300° C. On the other hand, the crosstalk deteriorates during the temperature decreasing and the temperature maintaining at +40° C. Residual stress due to the polyimide coating is induced when the silica-based glass is coated with the polyimide by thermal curing during the fiber drawing process, and the residual stress causes microbending generation. The reason that crosstalk improves during the temperature increasing at the evaluation start is considered to be the reduction of microbending due to the release of the residual stress by heating.

From FIG. 8, in the lower temperature range (−60 to +40° C.), it was confirmed that the fluctuation of the polarization crosstalk is suppressed at approximately +/−1 dB/100 m during the temperature decreasing and the temperature maintaining at −60° C. From the above, it was confirmed that the polyimide-coated PANDA fiber of Example 1 satisfies the specification of the polarization crosstalk being approximately −25 dB/100 m or less in the temperature range of −60 to +300° C. (−24 dB/100 or less including the initial fluctuation in the higher temperature range).

(Relationship Between Modal Birefringence and Polarization Crosstalk, Transmission Loss)

The superior polarization crosstalk performance of the polyimide-coated fiber of Example 1 described above can be realized because the smaller arrangement interval between the stress-applying parts 3 and 3 induces a large modal birefringence (design value is $5 \times 10^{-4}$ or more, measured value is $5.5 \times 10^{-4}$). When a polyimide-coated PANDA fiber whose modal birefringence (approximately $3 \times 10^{-4}$) is equivalent to a conventional PANDA fiber (for example, the UV-curable acrylate PANDA fiber of Comparative Example 1) was fabricated as a comparative example, the polarization maintaining performance significantly diminished, and the polarization crosstalk value was −10 dB/100 m.

Further small arrangement interval between the stress-applying parts 3 and 3 enables the polarization maintaining performance to be further improved, but since there is a trade-off between the polarization crosstalk and the transmission loss, it is undesirable because of the increase in transmission loss.

When a polyimide-coated PANDA fiber with modal birefringence of approximately $9 \times 10^{-4}$ was fabricated as a comparative example, while superior polarization crosstalk of −27 dB/100 m is obtained, the transmission loss became 3 dB/km. This transmission loss will allow a typical sensing application. However, it is difficult to perform sensing over a long distance (for example, in the case of long measurement distance in a huge objective structure to be measured, or in the case of long distance between the measuring apparatus and the object to be measured being spread out).

From the above result, the polyimide-coated PANDA fiber according to Example 1 has the characteristics of a low transmission loss (0.88 km/dB), a low bending loss (0.006 dB at a bending diameter of 20 mm×10 turns), and a superior polarization crosstalk (−25 dB/100 m). In addition, the polyimide-coated PANDA fiber according to Example 1 has hardly any transmission loss and fluctuation of the polarization crosstalk in a temperature range of −60 to +300° C. It was confirmed that the polyimide-coated PANDA fiber is suitable as an optical fiber for a sensor used in that temperature range.

(Mechanical Strength Characteristics)

The coating diameter of the polyimide-coated PANDA fiber according to Example 1 is 143 μm (design value is 145 μm). Taking the cladding diameter of 125 μm into account, the coating thickness is 9 μm (design value is 10 μm). This coating thickness is much thinner than that of a common UV-curable acrylate covered fiber, and a common polyimide-coated fiber with a 155 μm coating diameter (cladding diameter of both common fibers is 125 μm). For this reason, it is necessary to sufficiently consider the mechanical strength properties. Table 2 shows the fracture stress (F50 value) of the polyimide-coated PANDA fiber according to Example 1, the fracture stress being evaluated from the Weibull distribution plot of tensile stress test along the longitudinal direction of the fiber. As a comparative example, a polyimide single mode fiber (SMF) (Comparative Example 2) with a 125 μm cladding diameter and a 155 μm coating diameter was used. Note that 1 GPa corresponds to an approximately 1.389% extension of the fiber (the value being calculated given the Young's moduli of both the polyimide-coated PANDA fiber according to Example 1 and the polyimide-coated SMF of Comparative Example 2 are 72 GPa).

TABLE 2

| SAMPLE NAME | | FRACTURE STRESS F50 (GPa) |
|---|---|---|
| Polyimide-coated PANDA fiber of Example (with additive agent) (Example 1) | Before aging | 5.5 |
| | After 250 hours of aging at +300° C. | 4.6 |
| Conventional polyimide-coated fiber (without additive agent) (Comparative Example 2) | Before aging | 5.1 |
| | After 250 hours of aging at +300° C. | 2.9 |

The fracture stress of the polyimide-coated SMF of Comparative Example 2 is 5.1 GPa, while the fracture stress of the polyimide-coated PANDA fiber of Example 1 is 5.5 GPa. So it was confirmed that the mechanical strength property of the polyimide-coated PANDA fiber is more superior than that of conventional polyimide-coated SMF.

Figure 9:
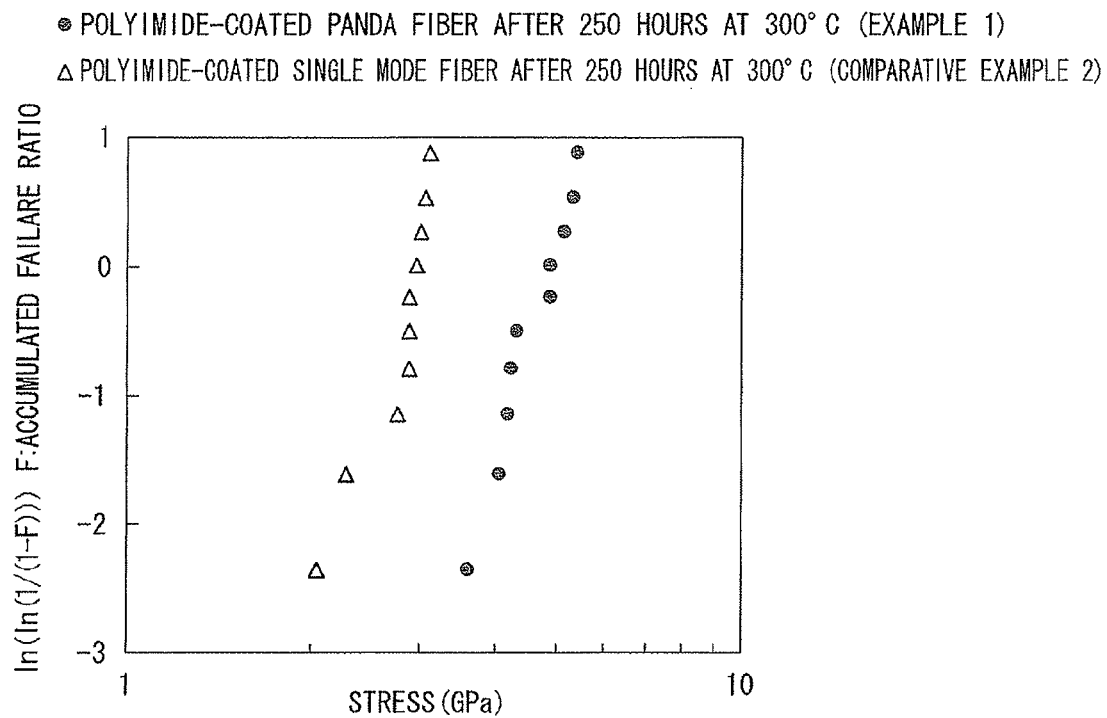
FIG. 9 is a graph showing a Weibull distribution plot of the tensile strength for the polarization-maintaining fiber of Example 1 and Comparative Example 2.

In addition, in consideration of the use of the polyimide-coated PANDA fibers of Example 1 in a temperature of +300° C., tensile stress test was performed after +300° C. aging. The Weibull distribution plot of the tensile strength with respect to the polyimide-coated PANDA fibers of Comparative Example 2 and the polyimide-coated PANDA fibers of Example 1, after +300° C. aging (250 hours), is shown in FIG. 9. Although the fracture stress (F50 value) of the polyimide-coated fiber of Comparative Example 2 was 2.9 GPa, a higher value of 4.6 GPa was obtained for the polyimide-coated PANDA fiber of Example 1. The strength of the polyimide-coated PANDA fiber of Example 1 is 1.6 times higher compared with the polyimide-coated fiber of Comparative Example 2. The additive agent added to the coating layer 4 of the polyimide-coated PANDA fiber of Example 1 can improve the adhesion between the cladding 2 (pure silica glass) and the coating layer 4 (polyimide).

It is considered that this additive agent can suppress degradation of the coating layer 4 at +300° C. and also can suppress damage to the surface of the cladding 2.

The improvement of the mechanical strength observed in the above evaluation indicates that the probability of deterioration of the coating layer 4 and fiber failure is small, and therefore, it is possible to perform simultaneous measurement of strain and temperature over a long period time even in a high temperature range of approximately +300° C.

In the polyimide-coated fiber of Example 1 explained above, it is shown that favorable optical properties (low transmission loss and superior polarization crosstalk) are realized by the polyimide coating with a thickness of 10 μm or less (measurement value: 9 μm), and the mechanical strength property (the tensile strength in the longitudinal direction of the fiber) is excellent even for this thickness.

However, if the polyimide coating thickness is thinner than required, it will become less resistant to a transverse pressure, an impact, or the like being applied from the outside. For this reason, it is preferable that the polyimide coating have a minimum required thickness. For example, in the case of the material of the object to be measured being CFRP, it is preferable that the thickness be larger than or equal to 6 μm (that is, the outer diameter of the coating be 141 μm) in order to prevent fiber fracture due to friction with the carbon fiber.

Example 2

Optical Fiber Sensor

A FBG was manufactured by a publicly known exposure method that uses a KrF excimer laser and a uniform phase mask in the polarization-maintaining fiber of Example 1. In the present Example, the grating length of the FBG was 10 mm, and in order to suppress the side lobe of Bragg reflection light, a publicly known apodized exposure method was performed.

Figure 10:
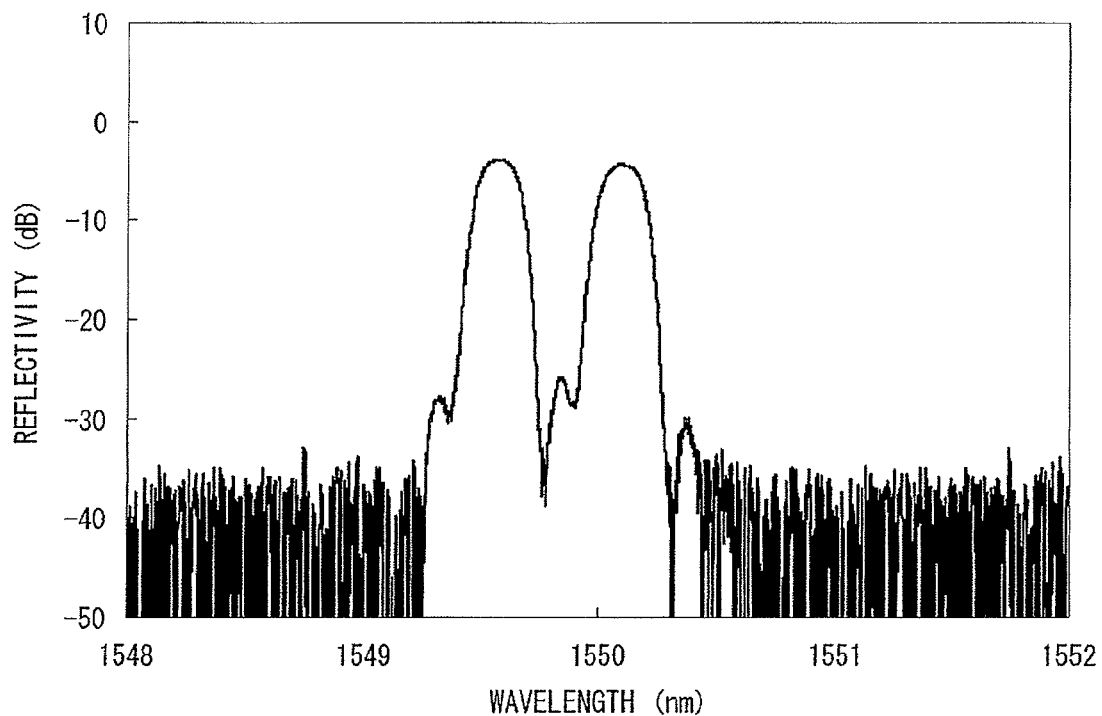
FIG. 10 is a graph showing the reflection spectrum of the FBG used in the optical fiber sensor of Example 2.

The reflection spectrum of this FBG was measured with spectrometry that uses a publicly known spectrum analyzer in an environment; under tensionless and at room temperature (+22° C.). FIG. 10 shows the measurement result. Note that the measurement was performed using polarization-independent amplified spontaneous emission (ASE) light as the measurement light so that the intensity of the light launched into two orthogonal polarization axes of the polarization-maintaining fiber are nearly the same. As for the two reflection peaks shown in FIG. 10, the peak on the shorter wavelength side is originated from the fast axial Bragg reflection light, while the peak on the longer wavelength side is originated from the slow axial Bragg reflection light. The center wavelength of these two reflection peaks was 1549.572 nm and 1550.100 nm, respectively. In this way, it was confirmed that these peaks are clearly separated.

Figure 11:
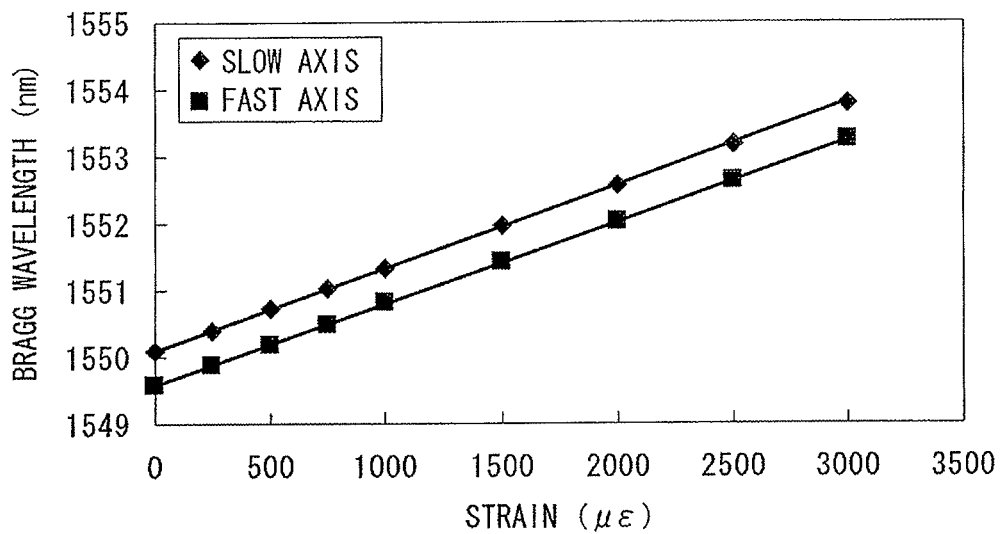
FIG. 11 is a graph showing the relationship between set strain and Bragg wavelength of the FBG used in the optical fiber sensor of Example 2.
Figure 12:
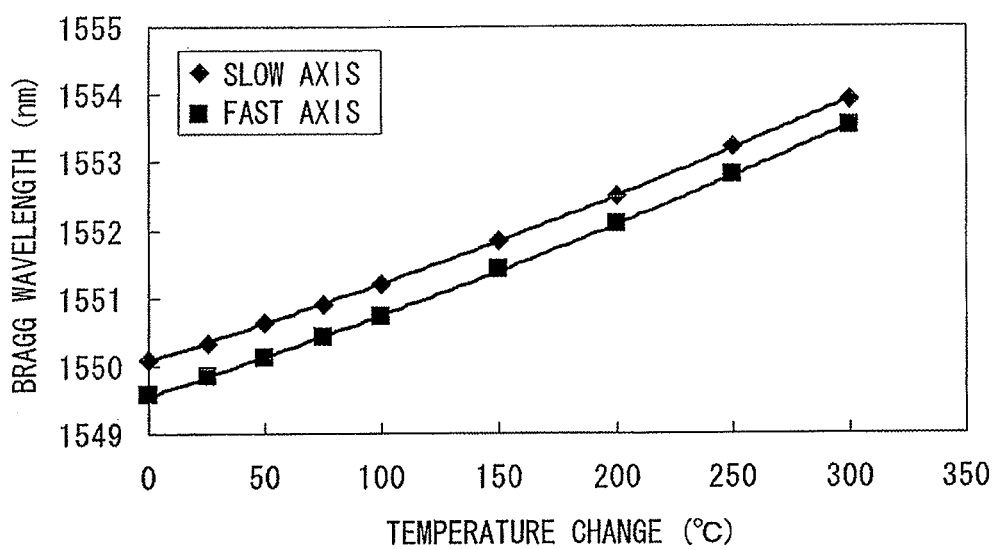
FIG. 12 is a graph showing the relationship between set temperature change and Bragg wavelength of the FBG used in the optical fiber sensor of Example 2.

FIG. 11 is a graph showing the relationship between the set strain and the Bragg wavelength of the FBG. Also, FIG. 12 is a graph showing the relationship between the set temperature change and the Bragg wavelength of the FBG. The strain dependence of FIG. 11 was measured while applying tension (strain) on the FBG at room temperature (+22° C.). The temperature dependence of FIG. 12 was measured while heating the FBG under tensionless condition (no strain condition).

As a result of a straight line approximation of the strain dependence of the Bragg wavelength (FIG. 11), a correlation function ($R^2$) of this approximate expression was evaluated. Equation (1) shows the relationship between strain and the Bragg wavelength on the slow axis. Also, Equation (2) shows the relationship between strain and the Bragg wavelength on the fast axis. Note that as for the units in Equation (1) and Equation (2), the Bragg wavelength (y) is in nm, and the strain (x) is in με, with 1με corresponding to fiber extension of $1 \times 10^{-4}$%.

[Equation 1]

$$y = 1.234 \times 10^{-3} x + 1550.106$$

$$(R^2 = 0.9999) \quad (1)$$

[Equation 2]

$$y = 1.221 \times 10^{-3} x + 1549.577$$

$$(R^2 = 0.9999) \quad (2)$$

Also, a result of quadratically approximating the temperature dependence of the Bragg wavelength (FIG. 12) was obtained, and a correlation function ($R^2$) of this approximate expression was evaluated. Equation (3) shows the relationship between the temperature change and the Bragg wavelength on the slow axis. Also, Equation (4) shows the relationship between the temperature change and the Bragg wavelength on the fast axis. Note that as for the units in Equation (3) and Equation (4), the Bragg wavelength (y) is in nm, and the temperature change (x) is in ° C.

[Equation 3]

$$y = 7.496 \times 10^{-6} x^2 + 10.562 \times 10^{-3} x + 1550.079$$

$$(R^2 = 0.9998) \quad (3)$$

[Equation 4]

$$y = 6.980 \times 10^{-6} x^2 + 11.186 \times 10^{-3} x + 1549.553$$

$$(R^2 = 0.9999) \quad (4)$$

From the above, it was confirmed that the Bragg reflection light of each of the slow axis and the fast axis shows wavelength shift characteristics that can be approximated with a high correlation function with respect to strain and temperature change.

Regarding the temperature dependence of the Bragg wavelength because an $R^2$ sufficient for realizing satisfactory precision in a measurement cannot be obtained with a linear approximation, a quadratic approximation was performed. Since the Bragg wavelength shift with respect to temperature change is mainly due to the refractive index change of a fiber core, this refractive index change is approximated with a polynomial equation. In conventional techniques, a sufficient $R^2$ is obtained even with a linear approximation because the range of a temperature change is narrow (0 to 100° C.), but in the present Example, since the range of a temperature change is wide (0 to 300° C.), a quadratic approximation was used.

Figure 13:
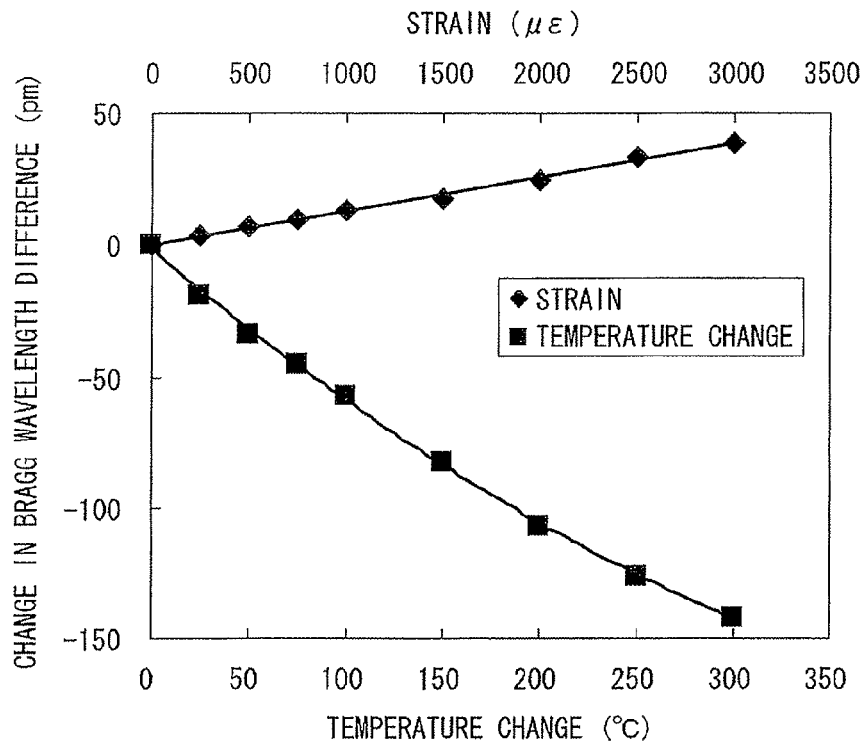
FIG. 13 is a graph showing the relationship between set strain, set temperature change and Bragg wavelength difference for the FBG used in the optical fiber sensor of Example 2.

FIG. 13 is a graph showing the change in the Bragg wavelength difference with respect to the set strain and the set temperature change of the FBG that is obtained from FIG. 11 and FIG. 12.

The "strain" plot in FIG. 13 shows the "strain dependence of the Bragg wavelength difference change", given that the difference between the Bragg wavelength of the slow axis and the Bragg wavelength of the fast axis at no strain (0με) that is obtained from FIG. 11 is 0 pm. Also, the "temperature change" plot in FIG. 13 shows the "temperature dependence of the Bragg wavelength difference change", given that the difference between the Bragg wavelength of the slow axis and the Bragg wavelength of the fast axis at room temperature (temperature change 0° C.) that is obtained from FIG. 12 is 0 pm.

As shown in FIG. 13, as the strain increases, the difference between the Bragg wavelengths of the slow axis and the fast axis increases, and as the temperature increases, the difference between the Bragg wavelengths of the slow axis and the fast axis increases in the minus direction.

In this way, it was confirmed that the Bragg wavelength difference changes with respect to strain and temperature change because the wavelength change characteristics of the slow axis and the fast axis are different with respect to strain and temperature change. From this result, it was confirmed that simultaneous measurement of strain and temperature using the FBG formed in the polarization-maintaining fiber of Example 1 is theoretically possible.

Next, on the basis of the Bragg wavelength shift characteristics for the strain and temperature change on the slow axis and fast axis calculated from FIG. 11 and FIG. 12, simultaneous measurement of strain and temperature was performed under a temperature range of +22° C. (temperature change 0°

C.) to +322° C. (temperature change 300° C.) using the equation disclosed in Non-patent Document 1.

The determinant showing the Bragg reflection light change of the slow axis and the fast axis with respect to the strain and the temperature change can be expressed as Equation (5) based on Equation (1) to Equation (4). Note that regarding the units in Equation (5), the Bragg wavelength shift ($\Delta\lambda_{slow}$, $\Delta\lambda_{fast}$) is in pm, strain ($\Delta\epsilon$) is in µε, and temperature change ($\Delta T$) is in ° C., given that the reference strain is 0µε and the reference temperature change is 0° C.

[Equation 5]

$$\begin{bmatrix} \Delta\lambda_{slow} \\ \Delta\lambda_{fast} \end{bmatrix} = \begin{bmatrix} 1.234 & 10.562 & 7.496\times 10^{-3} \\ 1.221 & 11.186 & 6.980\times 10^{-3} \end{bmatrix} \begin{bmatrix} \Delta\varepsilon \\ \Delta T \\ \Delta T^2 \end{bmatrix} \quad (5)$$

Strain and temperature change were simultaneously imparted to the FBG. The wavelength change of the Bragg reflection light of the slow axis and the fast axis at this time was substituted into Equation (5), and the strain ($\Delta\epsilon$) and temperature change ($\Delta T$) were evaluated. The results are shown in Table 3. Table 3 shows the measurement values at that time and the errors from the set value. Upon measuring the strain and temperature under a total of 27 conditions, in each of the conditions, a high accuracy measurement result was obtained, namely, strain measurement error being +/−100µε and temperature measurement error being +/−10° C.

Note that since there is the item $\Delta T^2$, that is, $\Delta T \times \Delta T$, in Equation (5), when $\Delta\epsilon$ is eliminated from Equation (5), a quadratic equation of $\Delta T$ is obtained, and thus two solutions for the temperature change ($\Delta T$) can be evaluated. Since a solution of strain ($\Delta\epsilon$) exists for each solution of $\Delta T$, two solutions for strain ($\Delta\epsilon$) can be obtained.

However, another solution of temperature change in the range of strain and temperature change carried out here is 1364 to 1669° C., which is a temperature range at which the polarization-maintaining fiber and the optical fiber sensor of the present Example cannot measure. Accordingly, it is clear that the temperature changes shown in Table 3 are the true values. Given that the temperature change is 1364 to 1669° C., the strain becomes −17085 to −31167µε (that is, a negative value, which denotes compressive strain). Such a strain value cannot be measured due to buckling of the polarization-maintaining fiber. Accordingly, it is clear that the strain shown in Table 3 is the true value.

Example 3

Optical Fiber Sensor that is Attached to a Structure

Measurement of the strain and temperature induced in a structure was performed using the FBG of Example 2. In the present Example, a base plate of stainless steel (SUS304) is used as the structure. First, the sensing portion (FBG) of the optical fiber sensor was directly attached to the base plate. Then, the base plate and the FBG were installed in the thermostatic oven. Subsequently, the thermostatic oven was set to a temperature of −60 to +100° C., and the temperature change of the base plate and the strain due to the linear expansion of the base plate resulting from this temperature change were measured. At this time, the measurement was performed on the condition of the thermostatic oven and the base plate temperature being the same. Note that as the adhesive used for attaching the FBG to the base plate, the same polyimide as the coating layer of the polarization-maintaining fiber was used.

Figure 14:
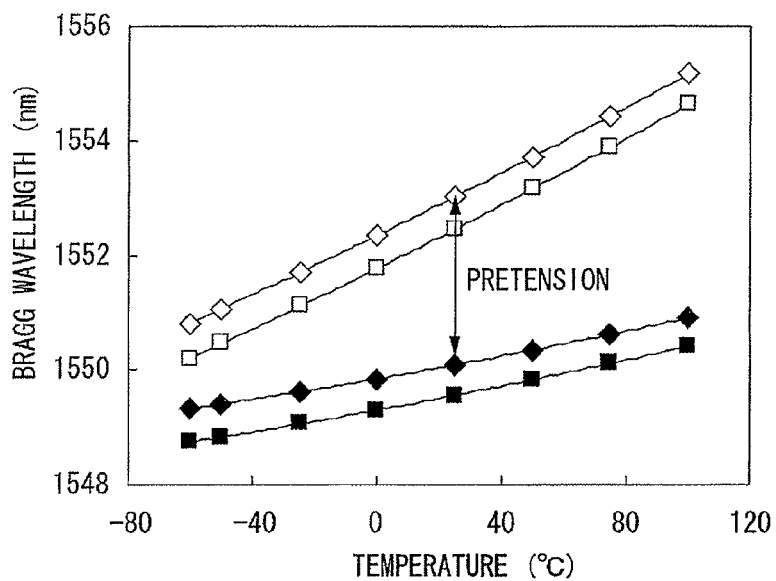
FIG. 14 is a graph showing the relationship between set temperature and Bragg wavelength for the FBG attached to a base plate (Example 3) and the FBG not being attached to the base plate (Example 2).

FIG. 14 is a graph showing the relationship between the set temperature of the FBG being attached to the base plate (Example 3) and the FBG not being attached to the base plate (Example 2) (set temperature of the thermostatic oven, that is, the environmental temperature), and the Bragg wavelength. The difference between the Bragg wavelength of the FBG being attached to the base plate (Example 3) and the FBG not being attached to the base plate (Example 2) in the case of the temperature +25° C. shows the amplitude of the initial tension at the time of FBG being attached to a base plate. Here, the initial tension is defined as the strain being applied to the FBG in the case of the temperature being +25° C., and the base plate at this temperature is in a no-strain state in which there is no expansion or shrinkage.

In FIG. 14, focusing on the difference between the Bragg wavelengths of the FBG being attached to the base plate (Example 3) and the FBG not being attached to the base plate (Example 2), when the temperature of the base plate is higher than or equal to +25° C., the difference becomes larger due to tensile strain being induced in the FBG by the linear expansion of the base plate. On the other hand, in the case of the temperature being less than +25° C., it turned out that the

TABLE 3

| | | SET TEMPERATURE CHANGE | | | | | | | |
|---|---|---|---|---|---|---|---|---|---|
| | | 0° C. | | 100° C. | | 200° C. | | 300° C. | |
| | | MEASURED VALUE | ERROR | MEASURED VALUE | ERROR | MEASURED VALUE | ERROR | MEASURED VALUE | ERROR |
| Set Strain | 0 µε | — | — | −18.6 µε | −18.6 µε | −74.0 µε | −74.0 µε | −63.4 µε | −63.4 µε |
| | | — | — | 99.1° C. | −0.9° C. | 204.9° C. | +4.9° C. | 302.5° C. | +2.5° C. |
| | 500 µε | 512.0 µε | +12.0 µε | 495.4 µε | −4.6 µε | 487.0 µε | −13.0 µε | 580.5 µε | +80.5 µε |
| | | −0.5° C. | −0.5° C. | 98.6° C. | −1.4° C. | 203.2° C. | +3.2° C. | 291.0° C. | −9.0° C. |
| | 1000 µε | 1007.5 µε | +7.5 µε | 975.4 µε | −24.6 µε | 1013.0 µε | +13.0 µε | 1038.7 µε | +38.7 µε |
| | | 0.1° C. | +0.1° C. | 100.9° C. | +0.9° C. | 200.4° C. | +0.4° C. | 294.1° C. | −5.9° C. |
| | 1500 µε | 1486.7 µε | −13.3 µε | 1479.1 µε | −20.9 µε | 1480.4 µε | −19.6 µε | 1550.3 µε | +50.3 µε |
| | | 2.1° C. | +2.1° C. | 100.1° C. | +0.1° C. | 203.0° C. | +3.0° C. | 292.9° C. | −7.1° C. |
| | 2000 µε | 1991.0 µε | −9.0 µε | 1998.4 µε | −1.6 µε | 1934.3 µε | −65.7 µε | 2043.0 µε | +43.0 µε |
| | | 1.4° C. | +1.4° C. | 97.7° C. | −2.3° C. | 205.1° C. | +5.1° C. | 294.2° C. | −5.8° C. |
| | 2500 µε | 2511.3 µε | +11.3 µε | 2462.0 µε | −38.0 µε | 2476.7 µε | −23.3 µε | 2422.4 µε | −77.6 µε |
| | | −0.5° C. | −0.5° C. | 101.5° C. | +1.5° C. | 200.4° C. | +0.4° C. | 303.5° C. | +3.5° C. |
| | 3000 µε | 3000.6 µε | +0.6 µε | 2957.9 µε | −42.1 µε | 2998.3 µε | −1.7 µε | 2965.9 µε | −34.1 µε |
| | | 0.0° C. | ±0.0° C. | 100.4° C. | +0.4° C. | 195.2° C. | −4.8° C. | 297.3° C. | −2.7° C. | difference becomes smaller due to compressive strain being induced in the FBG by the shrinkage of the base plate.

The shift in the Bragg wavelength of the FBG that is attached to the base plate (Example 3), obtained in FIG. 14, is caused by the temperature change of the base plate and the strain due to the linear expansion of the base plate accompanying the temperature change. Therefore, by performing simultaneous measurement, the effects of the strain and temperature change were discriminated from each other. The Equation (1) was used for the strain dependence of the slow axis in this measurement, and the Equation (2) was used for the strain dependence of the fast axis. Also, the result of quadratically approximating the shift characteristics of the Bragg wavelength of the FBG not being attached to the base plate shown in FIG. 14 (Example 2) was used to obtain the temperature dependence of the Bragg wavelength. Equation (6) shows the relationship between the temperature change and the Bragg wavelength in the slow axis. Also, Equation (7) shows the relationship between the temperature change and the Bragg wavelength in the fast axis. Note that as for the units in Equation (6) and Equation (7), the Bragg wavelength (y) is in nm, and the temperature change (x) is in ° C.

[Equation 6]

$$y = 12.159 \times 10^{-6} x^2 + 9.972 \times 10^{-3} x + 1550.084$$

$$R^2 = 0.9999 \quad (6)$$

[Equation 7]

$$y = 11.220 \times 10^{-6} x^2 + 10.502 \times 10^{-3} x + 1549.534$$

$$R^2 = 0.9999 \quad (7)$$

When using the strain and temperature dependence of the Bragg wavelength shift in the slow axis and the fast axis evaluated above, a determinant representing the Bragg reflection light of the slow axis and the fast axis with respect to the strain and the temperature change is expressed as in Equation (8). Note that as for the units in Equation (8), the Bragg wavelength shift ($\Delta\lambda_{slow}$, $\Delta\lambda_{fast}$) is in pm, the strain ($\Delta\varepsilon$) is in $\mu\varepsilon$, and the temperature ($\Delta T$) is in ° C., given that the reference strain is $0\mu\varepsilon$, and the reference temperature is +25° C.

[Equation 8]

$$\begin{bmatrix} \Delta\lambda_{slow} \\ \Delta\lambda_{fast} \end{bmatrix} = \begin{bmatrix} 1.234 & 9.972 & 12.159 \times 10^{-3} \\ 1.221 & 10.502 & 11.220 \times 10^{-3} \end{bmatrix} \begin{bmatrix} \Delta\varepsilon \\ \Delta T \\ \Delta T^2 \end{bmatrix} \quad (8)$$

Since the reference strain in Equation (8) is $0\mu\varepsilon$, the strain value that is calculated in Equation (8) is the sum value of the initial tension applied to the FBG and the strain due to the linear expansion of the base plate. Therefore, at first, using Equation (5), the initial tension applied to the FBG was evaluated to be $2397\mu\varepsilon$. That is, the value obtained by subtracting $2397\mu\varepsilon$ from the strain value calculated using Equation (8) became the strain value due to the linear expansion of the base plate. In addition, since the reference temperature of Equation (8) is +25° C., the value obtained by adding +25° C. to the value of the temperature change calculated using Equation (8) became the temperature value.

Figure 15:
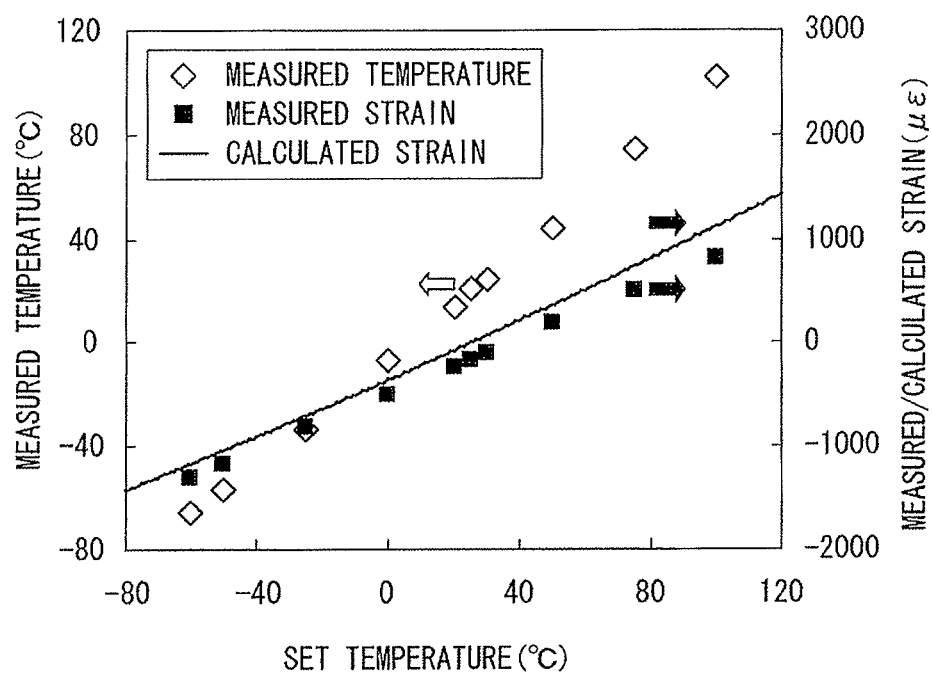
FIG. 15 is a graph showing the result of measured temperature of the base plate and measured strain due to the linear expansion of the base plate using the FBG attached to a base plate (Example 3).

FIG. 15 is the result of the measured temperature of the base plate and the measured strain due to the linear expansion of the base plate accompanying the temperature change, from the Bragg wavelength shift of the FBG attached to the base plate (Example 3), using Equation (8) based on the result of FIG. 14. In this graph, the horizontal axis shows the set temperature of the thermostatic oven, and the left axis of the graph (the vertical axis positioned on the left side in FIG. 15) shows the measured values of the temperature. Also, the right axis of the graph (the vertical axis positioned on the right side in FIG. 15) shows the measured values of strain, and the solid line in the graph shows the calculated values of strain from the linear expansion coefficient of the base plate (SUS304). That is, when the measured values of strain are close to the solid line, result of the simultaneous measurement is appropriate. As shown in FIG. 15, in the range of −60 to +100° C., the temperature change of the base plate accompanying a set value of the thermostatic oven and the strain due to the linear expansion of the base plate were measured simultaneously with high accuracy.

As described above, it was demonstrated in Example 3 that the optical fiber sensor of the invention can measure strain and temperature induced in a structure simultaneously, by measuring the temperature change of the base plate and the strain due to the linear expansion of the base plate accompanying the temperature change simultaneously. Note that in the invention, simultaneous measurement is possible even in the case of mechanical strain being induced in the base plate along the longitudinal direction of the optical fiber. In this case, the strain value is calculated as the sum value of the mechanical strain and the strain due to the linear expansion of the base plate. Of course, if the strain value due to linear expansion of the base plate obtained in the present Example is evaluated in advance, in the case of mechanical strain being induced, it is possible to discriminate the mechanical strain from the strain due to the linear expansion of the base plate.

Furthermore, since the simultaneous measurement was carried out at −60 to +25° C. in the present Example along with the result of Example 2, it can be said that the optical fiber sensor of the invention is capable of measuring strain and temperature simultaneously in the range of −60 to +322° C.

According to Examples 1 to 3 described above, a polarization-maintaining fiber that can be used in the temperature range of approximately −60 to +300° C., and an optical fiber sensor having a sensing portion that includes the polarization-maintaining fiber and being capable of simultaneous measurement of strain and temperature are obtained. This polarization-maintaining fiber exhibits low transmission loss (0.88 km/dB), low bending loss (0.006 dB at bending diameter 20 mm×10 turns), and superior polarization crosstalk (−25 dB/100 m). In addition, since there is hardly any fluctuation of the transmission loss and polarization crosstalk in a temperature range of −60 to 300° C., the polarization-maintaining fiber is suitable for an optical fiber for a sensor that is used in that temperature environment.

Moreover, a fiber sensor having a sensing portion that includes the aforementioned polarization-maintaining fiber can measure strain and temperature simultaneously in the temperature range of approximately −60 to 300° C. In particular, by using the FBG that is formed in the fiber as the sensing portion, a high accuracy measurement result can be obtained in which the strain measurement error is +/−$100\mu\varepsilon$ and temperature measurement error is +/−10° C. Furthermore, by attaching the sensing portion to a structure that is the object to be measured, it is also possible to measure induced strain and temperature in the structure simultaneously.

INDUSTRIAL APPLICABILITY

With the polarization-maintaining fiber of the invention and the optical-fiber sensor using the polarization-maintaining fiber, it is possible to measure strain and temperature change simultaneously in a temperature range of approximately −60 to 300° C. Therefore, application is possible to a high temperature environment typified by oil wells and to an environment with large temperature fluctuations typified by aircraft.

What is claimed is:

1. A polarization-maintaining fiber comprising:
a core made of germanium doped silica glass;
a sensing portion comprising a fiber Bragg grating that is formed in the core;
a pair of stress-applying part made of boron doped silica glass that are separated from the core, and are arranged so as to face each other symmetrically for the core;
a cladding made of pure silica glass that encloses the core and the stress-applying parts; and
a polyimide coating layer with a thickness of 10 μm or less that surrounds the outer periphery of the cladding, wherein:
a modal birefringence at a wavelength of 1550 nm and at a temperature of +22° C. is larger than or equal to $5\times10^{-4}$; and
a polarization crosstalk is −25 dB/100 m or less.

2. An optical fiber sensor using the polarization-maintaining fiber according to claim 1, wherein
the sensing portion measures strain and temperature simultaneously in a temperature range of −60 to +300° C.

3. The optical fiber sensor according to claim 2, wherein
the sensing portion is attached to a structure that is an object to be measured, and
the sensing portion measures induced strain and temperature in the structure simultaneously.

* * * * *